United States Patent
Xu et al.

(10) Patent No.: US 8,682,881 B1
(45) Date of Patent: Mar. 25, 2014

(54) SYSTEM AND METHOD FOR EXTRACTING STRUCTURED DATA FROM CLASSIFIED WEBSITES

(75) Inventors: Cheng Xu, Sunnyvale, CA (US); Gang Feng, Beijing (CN); Xin Li, Beijing (CN)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 13/227,379

(22) Filed: Sep. 7, 2011

(51) Int. Cl.
*G06F 17/30* (2006.01)

(52) U.S. Cl.
USPC ............................................ 707/706; 707/749

(58) Field of Classification Search
USPC ................................................ 707/706, 749
See application file for complete search history.

(56) References Cited

U.S. PATENT DOCUMENTS

| | | | |
|---|---|---|---|
| 7,788,132 B2 | 8/2010 | Desikan et al. | |
| 7,870,132 B2 * | 1/2011 | Chen et al. | 707/736 |
| 7,921,052 B2 * | 4/2011 | Dabney et al. | 705/37 |
| 8,042,052 B2 | 10/2011 | Choi | |
| 8,122,005 B1 | 2/2012 | Juang et al. | |
| 8,126,930 B2 | 2/2012 | Shukla et al. | |
| 8,131,742 B2 | 3/2012 | Stellhorn et al. | |
| 8,140,111 B2 | 3/2012 | Wyler | |
| 8,185,552 B1 | 5/2012 | Chow et al. | |
| 8,195,666 B2 | 6/2012 | Jeavons | |
| 8,219,688 B2 * | 7/2012 | Wang | 709/227 |
| 8,255,793 B2 | 8/2012 | Chakrabarti et al. | |
| 8,527,357 B1 * | 9/2013 | Ganesan | 705/26.1 |
| 8,549,443 B2 * | 10/2013 | Irvine | 715/863 |
| 2011/0225152 A1 * | 9/2011 | Beaudreau et al. | 707/728 |
| 2012/0072409 A1 * | 3/2012 | Perry et al. | 707/710 |

* cited by examiner

*Primary Examiner* — Kim Nguyen

(74) *Attorney, Agent, or Firm* — Morgan, Lewis & Bockius LLP

(57) ABSTRACT

Systems, methods, and computer readable storage mediums are provided for automatically extracting data from a classified website. A website is determined to be a classified website based on a set of heuristics. Then page models for other classified websites are accessed. The page models may include listing page models, detail page models, and/or city page models. A listing page in the classified website is determined based on similarity of the listing page to the page models for the other classified websites. Then a listing page model for the listing page in the classified website is created. After the model has been created data from the classified website is extracted based at least in part on the listing page model. Similar processes are performed for determining a details page, creating a details page model, and extracting data from the classified website using a details page model.

24 Claims, 11 Drawing Sheets

Extracted Data Store
124

| Attributes | Values | |
|---|---|---|
| Address (URL) | link | 602 |
| Posting Time | # | 604 |
| Price | # | 606 |
| Bedroom No. | # | 608 |
| Bathroom No. | # | 610 |
| Street Address | text | 612 |
| No Smoking | Y/N | 614 |
| Pets | Y/N | 616 |
| Square Ft | # | 618 |
| Property Type | text | 620 |
| Neighborhood | text | 622 |
| Apt. Floor | # | 624 |
| Narrative Des. | text | 626 |
| ... | ... | |

Figure 6

SYSTEM AND METHOD FOR EXTRACTING STRUCTURED DATA FROM CLASSIFIED WEBSITES

TECHNICAL FIELD

The disclosed embodiments relate generally to the field of search engines for locating documents in a computer network (e.g., a distributed system of computer systems), and in particular, to a system and method for automatically identifying classified websites and extracting structured data from classified websites. This data can then be used to respond to classified website related queries.

BACKGROUND

Search engines are a powerful tool for locating documents and data from documents in a large database of documents, such as the documents on the World Wide Web (WWW) or the documents stored on the computers of an Intranet. The documents and/or data from the documents are located in response to a search query submitted by a user.

The World Wide Web and the web sites (including pages or documents) within it are a vast source of information. Some web sites specifically focus on classified postings. Classified postings typically allow users to post a description of a product, service, or property for sale or rent and provide a mechanism for interested buyers/renters to contact the user who posted the description. Usually classified websites are area specific. For example, the classified website Craigslist has a San Francisco Bay Area page that includes categories such as housing, for sale, jobs, personals, community, etc. If a renter wishes to find an apartment in Mountain View, he may go to a listing page, which provides a listing of rental properties available in the San Francisco Bay Area. The renter can then read through the listing page to find if any properties in Mountain View are available for rent ("e.g. $945 Gorgeous Studio"—Mountain View.) If so, the renter can click on a link to read a detailed description of the property on a details page and potentially see images of the property. Then the same actions can be performed for any other items listed on the classified website. In this example, if the user is not satisfied with the results provided by Craigslist, the user would then have to go to another classified website to search for additional property rentals available in Mountain View. This process of finding items on classified websites by individually drilling down to the item(s) of interest is time consuming and consequently frustrating for the user.

SUMMARY

The present invention overcomes the limitations and disadvantages described above by providing methods, systems, and computer readable storage mediums for automatically extracting data from a classified website.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide computer-implemented methods of automatically extracting data from a classified website. The method is performed on a server system having one or more processors and memory storing one or more programs for execution by the one or more processors. A website is determined to be a classified website. In some embodiments, the website is determined to be a classified website based on a set of heuristics as explained in more detail herein. For example, it may be determined that the website contains common classified site terms. Then page models for other classified websites are accessed. The page models may include listing page models, detail page models, and/or city page models. A listing page in the classified website is determined based on similarity of the listing page to the listing page models for the other classified websites. Then a listing page model for the listing page (or pages) in the classified website is created. Subsequently, data from the classified website is extracted based at least in part on the listing page model.

In some embodiments, a details page associated with the listing page in the classified website is also identified. The details page model for the details page is created and stored. Then data from the classified website is extracted and stored based at least in part on the details page model. Similarly, in some embodiments, one or more additional pages in the classified website are identified, and at least one additional model is created based on these additional pages. Then data from the classified website is extracted and stored based at least in part on this additional model. In some embodiments, the additional pages are identified based in part on user access data such as Internet activity data for a group of users.

In some embodiments, creating the listing page model is done as follows. One or more dynamic regions within the listing page are identified. Then a type of information associated with a respective dynamic region is determined. A listing page template that identifies the one or more dynamic regions and their associated type of information is created and stored. Similarly, in some embodiments, extracting data from the classified website is then done as follows. The listing page template is accessed. Content is extracted from a dynamic region identified in the listing page template. The extracted content is stored in a database as a value for the type of information associated with the dynamic region identified in the listing page template. Similar methods are used to create detail page templates and extract data from the classified website using the details page templates.

Some embodiments provide a server system comprising one or more central processing units, CPU(s), for executing programs and also includes memory storing the programs to be executed by the CPUs. The programs include instructions to perform any of the embodiments of the aforementioned methods of automatically extracting data from a classified website. Such a server system may also include program instructions to execute the additional options discussed above.

Yet other embodiments provide a non-transitory computer readable storage medium storing one or more programs configured for execution by a computer. The programs include instructions to perform any of the embodiments of the aforementioned methods of automatically extracting data from a classified website. Such a non-transitory computer readable storage medium may also include program instructions to execute the additional options discussed above.

Thus, these methods, systems, and computer readable storage mediums provide new, less cumbersome, more efficient ways to identify classified websites and extract data from them for subsequent use. They also provide various mechanisms and ways to overcome some of the problems discussed above.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 6 illustrates a data structure for an extracted data store with attribute value pairs in accordance with some embodiments.

DESCRIPTION OF EMBODIMENTS

As discussed in the background section, the process of manually finding items on a classified website can be time consuming and frustrating to a user because of the inherent nature of typical classified websites such as a categorical organization and geographically localized structure. It would be advantageous to provide a mechanism to help a user efficiently search classified websites. It would be advantageous to automatically identify classified websites and extract data from the identified classified websites. It would also be advantageous if the data was stored in a structured manner, such as by category. The data extracted would then be more easily available for use. For example, it would be advantageous if a user could quickly and efficiently search classified website postings by directly searching structured extracted data. It would also be advantageous if data extracted from a variety of classified websites could be provided in a single location. Thus, these methods, systems, and computer readable storage mediums discussed herein provide new, less cumbersome, more efficient ways to solve some of these problems such as by identifying classified websites and also by extracting data from them for subsequent use.

Figure 1:
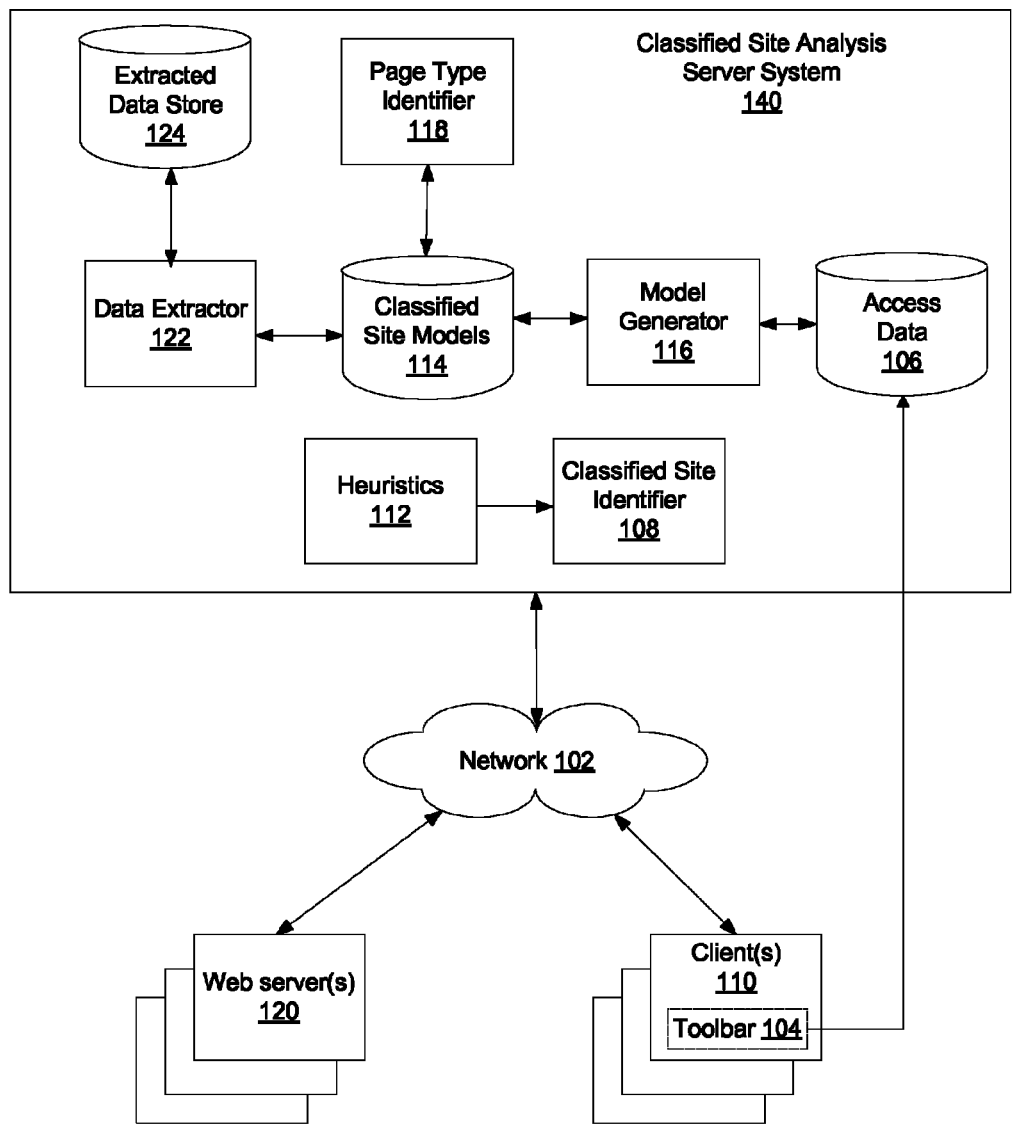
FIG. 1 is a block diagram illustrating an exemplary distributed computer system including a classified site analysis server system in accordance with some embodiments.

FIG. 1 is a block diagram illustrating an exemplary distributed computer system 100 including a classified site analysis server system 140 in accordance with some embodiments. It shows various functional components which will be referred to in the detailed discussion which follows. The distributed computer system 100 may include one or more client devices or systems 110, herein called client(s) 110 for ease of reference. A respective client 110 is connected to a communications network 102, which connects the client 110 to one or more web servers 120 and the classified site analysis server system 140. The classified site analysis server system 140 extracts data from one or more classified websites of the web servers 120 as will be described in more detail herein. In some embodiments, when a client submits a classified site query, the classified site analysis server system 140 provides information from one or more classified websites of the web servers 120 in response to the query.

A respective client 110 typically includes one or more processing units (CPU's), one or more network or other communications interfaces, memory storing programs for execution, and one or more communication buses for interconnecting these components as well as a user interface comprising a display device and an input mechanism, not shown in this figure. In some embodiments, the client 110 includes a web search toolbar module 104 stored in its memory, such as a toolbar which allows users to easily perform web searches without needing to visit an a web page associated with the toolbar. In some embodiments, with a user's permission, the toolbar module 104 may track Internet activity data such as search, browse, and click-through data and provides this Internet activity data to the classified site analysis server system 140. In some embodiments, this Internet activity data for a group of users is stored in database 106 and is used in determining a website's structure or in identifying pages within a website. For example, in some embodiments, if a listing page is identified, pages accessed prior to the listing page are determined, as these pages are likely to be city pages or category pages. Similarly, in some embodiments, pages accessed after the listing page are determined, as these pages are likely to be details pages.

The classified site analysis server system 140 includes the following components in some of its embodiments. The classified site analysis server system 140 includes a classified site identifier 108, which determines whether a website is a classified website. In some implementations, the identification is based on a set of heuristics 112. The identification of a classified website will be explained in more detail with reference to the method illustrated in FIG. 9. The classified site analysis server system 140 includes a classified site models database 114, which stores classified site models such as listing page models and details page models. The models are created by the model generator 116 as described with reference to the method illustrated in FIG. 8. In some embodiments, a web page, such as a listing page or a details page is identified by a page type identifier 118 based on similarity of the respective page to page models of other known classified websites stored in the classified site models database 114. The model generator 116 then generates a model for the identified page, and the generated model is also stored in the classified site model database 114. The data extractor 122, extracts data from the classified website pages based on the page models (e.g., templates) stored in the classified site models database 114. The details of data extraction will be described in more detail with reference to FIG. 7. The data extractor 122 stores the extracted data in the extracted data store 124. The extracted data store 124 can then be accessed in order to return classified information in response to a user query or other request. In some embodiments, the information in the extracted data store 124 is used in determining how often the classified website should be crawled to retrieve data from new postings.

Figure 2:
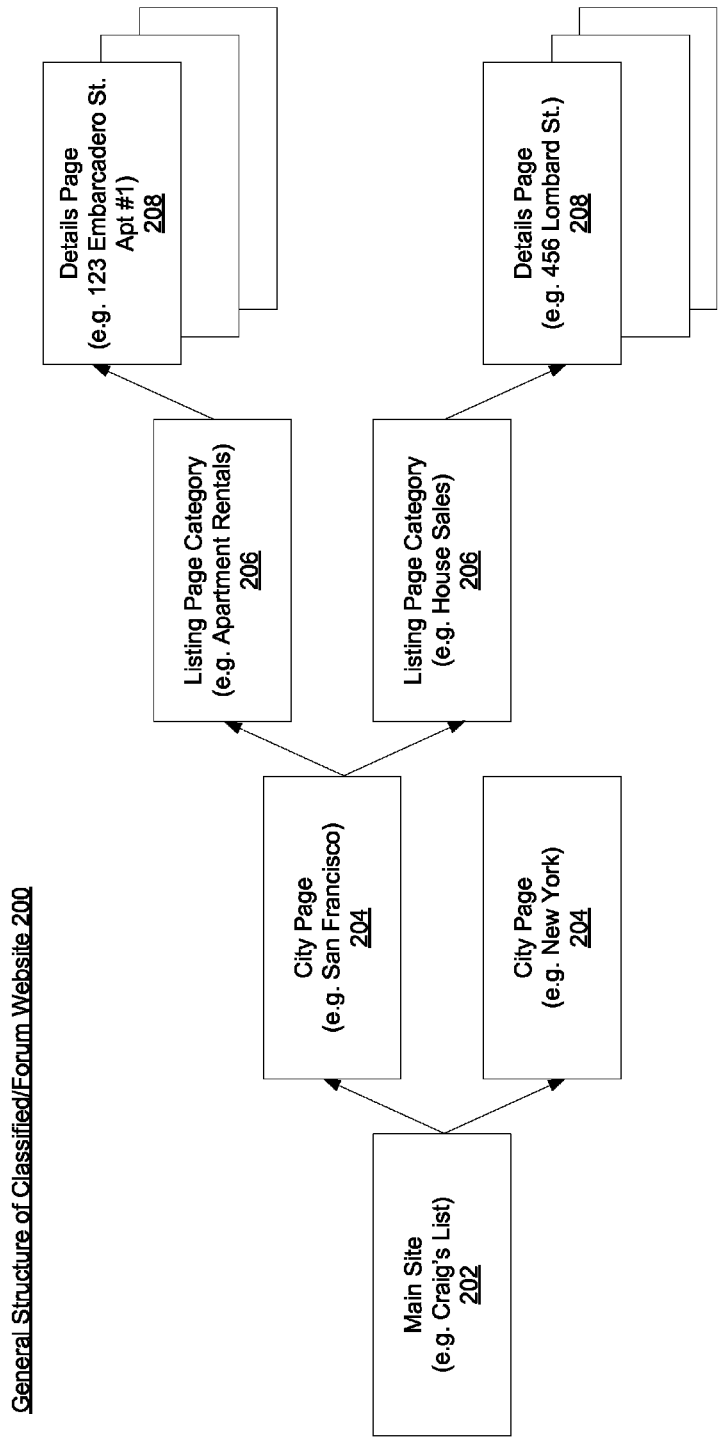
FIG. 2 illustrates an example structure often used by classified websites, which includes city pages, listing pages, and details pages.
Figure 10:
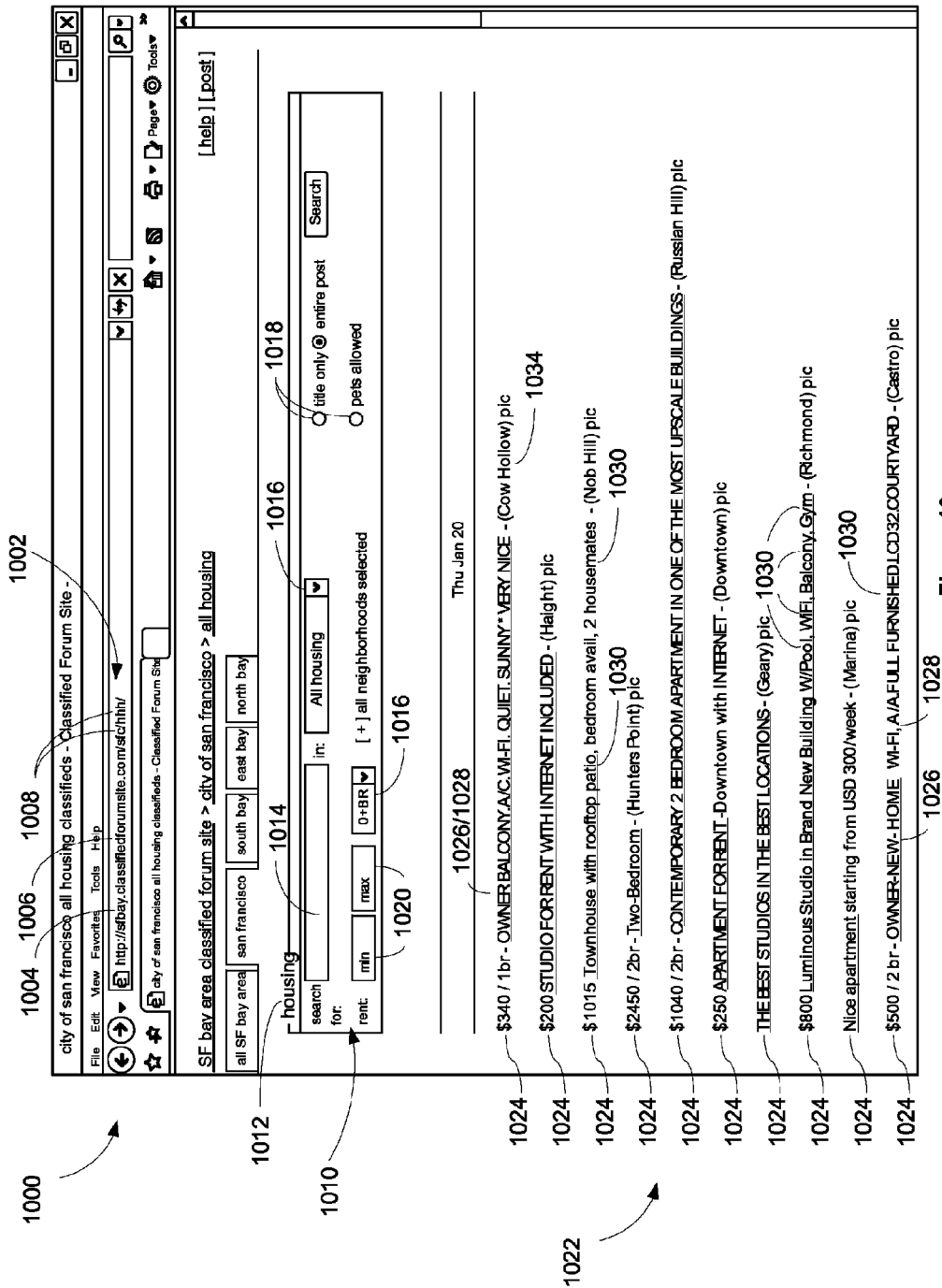
FIG. 10 is a schematic screen shot of an exemplary listing page for a classified website.

FIG. 2 illustrates an example site structure 200 often used by classified websites and forum websites. Classified websites, due to the information they typically provide, tend to have a structure such as that shown in FIG. 2. In some embodiments, the structure includes a main site page 202. The main site page provides links to area specific pages, sometimes referred to as city pages because they are typically associated with particular cities or metropolitan areas. In some embodiments, these city pages 204 are associated with areas near a particular city such as their associated state, counties, or country. In some embodiments, a classified site will have more than one level of city page 204, such as a general area such as San Francisco Bay Area page, as well as subpages such as Mountain View or Palo Alto. All of these pages are referred to herein as city pages 204. Some city pages 204 provide links to listing pages 206. An exemplary listing page is illustrated in FIG. 10. In classified websites, listing pages 206 tend to have a table like structure or list of titles or brief descriptive information about various related classified items such as price and address. In some embodiments, a listing page 206 is for a particular category or categories of listing within the city (or area) of the city page 204 with which it is associated. For example, as shown in FIG. 2, one listing page 206 provides a listing of apartments for rent in San Francisco while a separate listing page 206 provides a listing of houses for sale in San Francisco. Each item in the listing page's list corresponds to a page with more information about the item, called a details page 208. Details pages 208 generally provide a narrative description written by an individual poster about the posted item. In some embodiments, details pages provide a narrative description, pictures of the posted item, price information, contact information for the owner/seller, and a variety of other information.

In order to extract posted information (data) from a classified website, listing pages and details pages are identified and crawled periodically. Generally, given the nature of classified websites, these pages should be crawled much more often than typical websites because numerous postings are added by various users on a daily (or even hourly) basis. As such, it is useful to determine whether a website is a classified website or not in order to schedule crawling. Recognizing that a website is structured in a manner similar to this typical structure shown in FIG. 2 is one mechanism which is used in some embodiments to assist in determining if a website is a classified website. Furthermore, knowing a typical classified website structure helps a classified site analysis server system (140, FIG. 1) identify the listing pages and details pages within the classified website in order to extract data from them.

Figure 3:
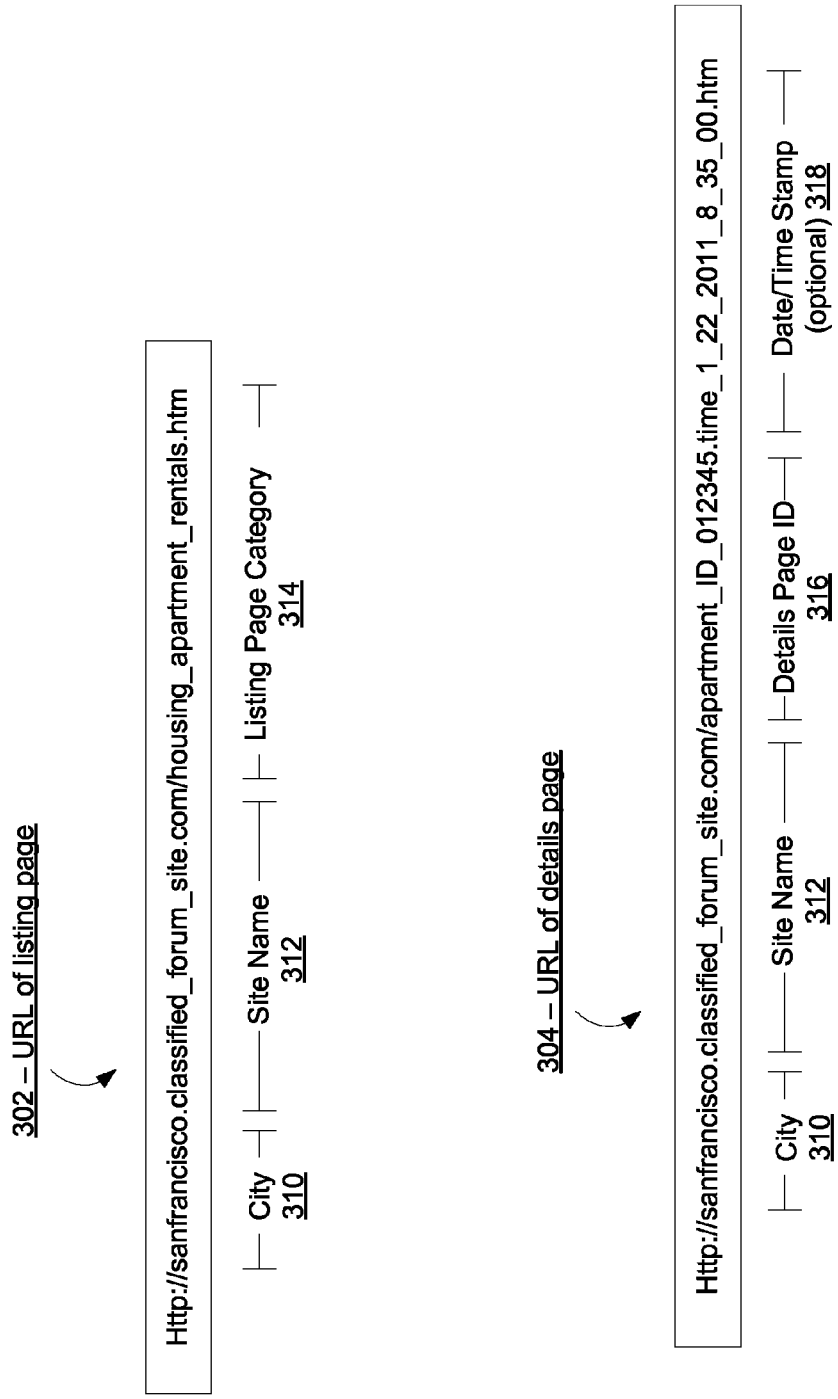
FIG. 3 provides example URLs of listing and details pages often used by classified websites which can include portions identifying a specific geographic region for the classified site, a site name, a listing page category, a detail page ID, and date/time stamps.

FIG. 3 provides an example URL of a listing page 302 and an example URL of a details page 304. Classified websites, due to the information they typically provide, tend to have URLs that conform to a typical structure as that shown in FIG. 3. The URL often starts with a geographic region portion 310, such as a city name. Often the URL then has a site name portion 312 following the geographic region portion 310. The URL of a listing page 302 typically ends with a listing page category portion 314 (e.g., "housing_apartment_rentals" is used to specify a page containing a listing of apartments for rent). The URL of a details page 304 typically includes a details page ID portion 316 and optionally includes a date and/or time stamp portion 318. In some embodiments, the URLs of the listing pages 302 and the URLs of the details pages 304 are analyzed to determine if they contain dynamic portions, and the dynamic portions are used as a source of information for the data extractor (122, FIG. 1). Furthermore, in some embodiments, the structure of one or more URLs is used in determining that a website is a classified website, or a candidate site (i.e., a potential classified website.) For example, if a URL has a geographic location name used prominently in the URL, as shown in city portion 310 of the URL of the listing page 302, as shown in FIG. 3, then the corresponding site is likely to contain geographically localized information. Determining that a website is geographically localized is a mechanism used in some embodiments to determine that a website is a candidate site. Additionally or alternatively, in some embodiments, determining that a website is a candidate site involves determining whether the URL contains one or more known candidate site terms, such as the name of one or more known classified websites.

Figure 4:
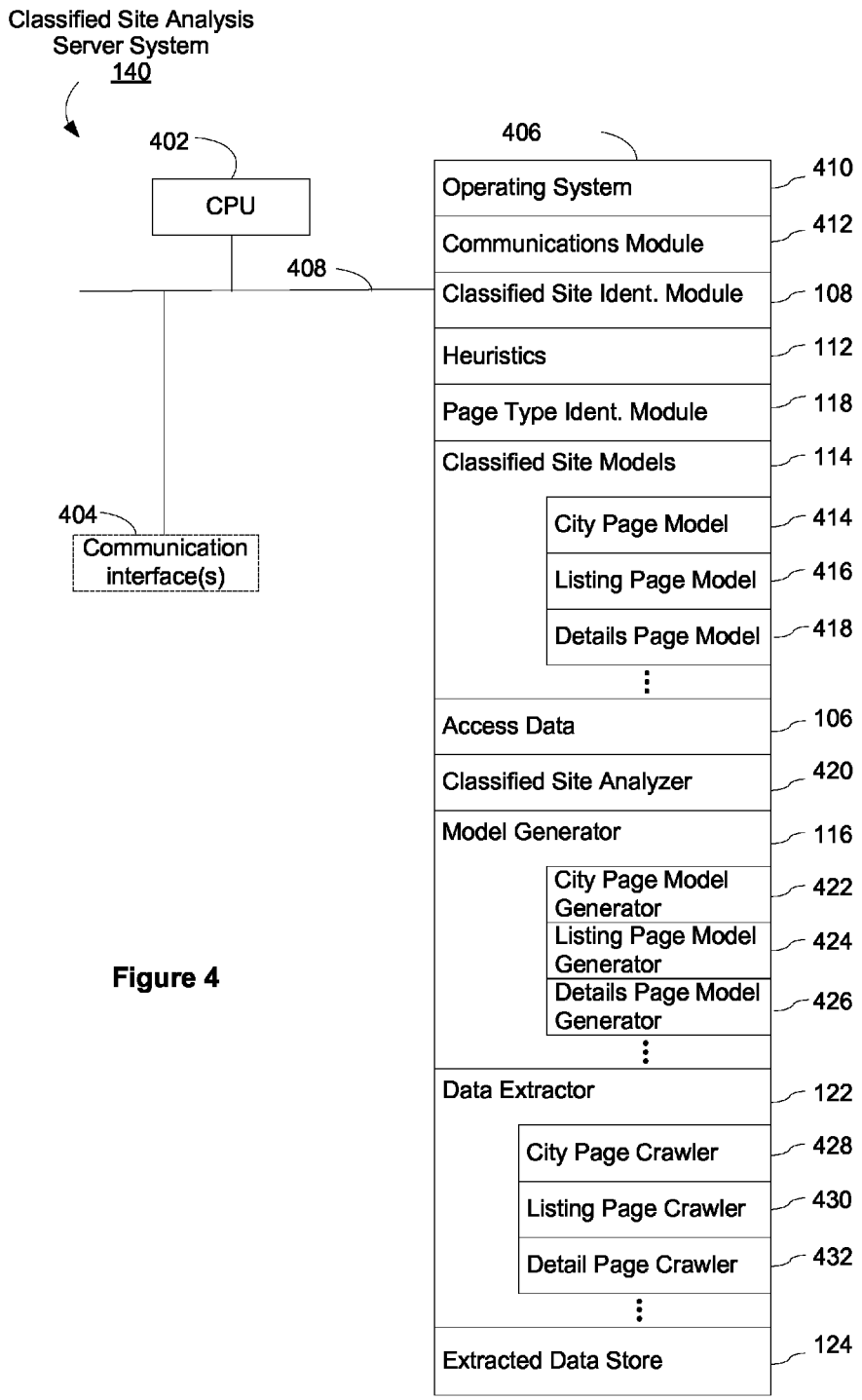
FIG. 4 is a block diagram illustrating an exemplary classified site analysis server system in accordance with some embodiments.

FIG. 4 is a block diagram illustrating an exemplary classified site analysis server system 140 in accordance with some embodiments. The classified site analysis server system 140 typically includes one or more processing units (CPU's) 402, one or more network or other communications interfaces 404, memory 406, and one or more communication buses 408 for interconnecting these components. The communication buses 408 optionally include circuitry (sometimes called a chipset) that interconnects and controls communications between system components. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternately the non-volatile memory device(s) within memory 406, comprises a non-transitory computer readable storage medium. In some embodiments, memory 406 or the computer readable storage medium of memory 406 stores the following programs, modules and data structures, or a subset thereof:

- An operating system 410 includes procedures for handling various basic system services and for performing hardware dependent tasks.
- A network communication module 412 is used for connecting classified site analysis server system 140 to other computers (e.g., clients 110 and web servers 120 FIG. 1) via the one or more communication network interfaces 404 (wired or wireless) and one or more communication networks (102, FIG. 1), such as the Internet, other wide area networks, local area networks, metropolitan area networks, and so on.
- A classified site identification module 108 determines whether a website is a classified website. In some implementations, the identification is based on a set of heuristics 112. In some embodiments, determining whether a website is a classified website involves a series of steps performed by the classified site identification module, which are discussed in detail with respect to FIG. 9.
- A page type identification module 118 identifies one or more pages in a classified web site based on similarity to one or more classified site page models for other classified websites.
- A classified site models database 114 stores various page type models such as city page model(s) 414, listing page models 416, and details page model(s) 418.
- Access data 106 includes Internet activity data received from one or more clients including search, browse, and click-through data.
- A classified site analyzer 420 analyzes the structure of a classified site.
- A model generator 116 which generates page models for the various types of pages of the classified website includes a city page model generator 422, a listing page model generator 424, and a details page model generator 426. The generated page models are stored in the classified site models database 114.

A data extractor 122 extracts data from the classified website pages based on the page models stored in the classified site models database 114. For example, the data extractor 122 includes various crawlers such as a city page crawler 428, a listing page crawler 430, and a details page crawler 432. In some embodiments, the crawlers extract contents from dynamic regions identified in a corresponding page model (e.g., the listing page crawler 430 extracts contents from dynamic regions identified by a listing page model 416 for a particular classified website.)

An extracted data store 124 stores the data extracted by the data extractors, as shown in more detail in FIG. 6. In some embodiments, the extracted data store 124 also contains lists of URLs to be crawled by the crawlers (such as the Listing Page URLs 702 and the Details Page URLs 708 shown in FIG. 7), while in other embodiments, the lists of URLs are stored in one or more databases separate from the extracted data store 124.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Although FIG. 4 shows a "classified site analysis server system 140," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a classified site analysis server system 140 and how features are allocated among them will vary from one implementation to another, and may depend in part on the amount of data traffic that the system must handle during peak usage periods as well as during average usage periods.

Figure 5:
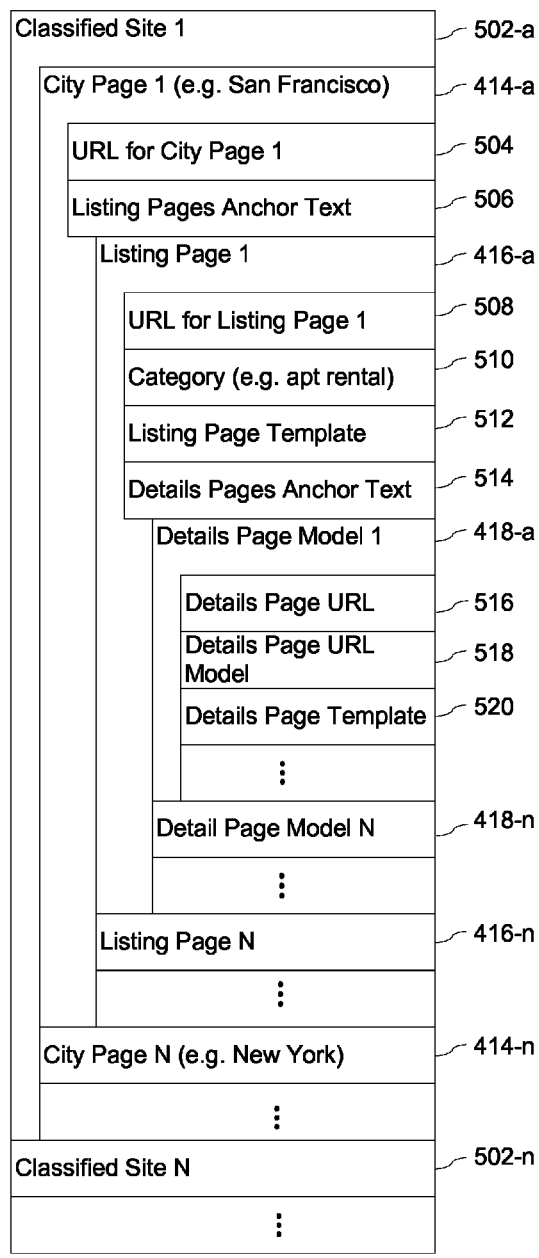
FIG. 5 illustrates a data structure for a classified models database in accordance with some embodiments.

FIG. 5 illustrates a data structure for a classified models database 114 in accordance with some embodiments. In some implementations the models for a particular classified site are stored together or in association with one another. An ID for a first classified site 502-*a* is stored. The classified site ID is a unique identifier for the classified site. In some embodiments, the classified site ID is a number while in other embodiments it is a URL or a pointer to the URL for the classified site. Models for city pages 414 (or geographic region pages) associated with the classified site are stored separately (414-*a* through 414-*n*). Also, URLs for their respective city pages 504 are stored. The city page model also includes listing page anchor text 506 for one or more listing pages linked to the city page.

Models for listing pages 416 associated with the classified site are stored separately (416-*a* through 416-*n*). In some embodiments, these listing page models 416 are stored in association with the city page model 414 to which they correspond. In other embodiments, listing page models 416 are uniform throughout a classified site and so need only be stored once. URLs for the respective listing pages 508 are stored. Furthermore, in some embodiments, the particular category 510 (e.g. apartment rentals) of a listing page is stored separately. The listing page model 416 also includes a listing page template 512. In some implementations, a listing page template 512 identifies dynamic regions and type information associated with the dynamic regions for the classified website's specific listing page. Dynamic regions are those portions of the page that change from page to page of a similar type, as opposed to the portions of the page that remain constant. For example, in some embodiments the listing pages are created when sellers fill in particular answers or choose a description from a set of choices, such as price, number of bedrooms, square footage for real-estate postings.

The listing page model 416 also includes details pages anchor text 514 for one or more details pages linked to the listing page. Models for details pages 418 associated with the classified site are stored separately (418-*a* through 418-*n*). In some embodiments, these details page models 418 are stored in association with the listing page model 416 to which they correspond. Also, URLs for their respective details pages 516 are stored. In some embodiments, a general model for a details page URL 518 is also stored. The details page model also includes a details page template 520. In some implementations, a details page template 520 identifies dynamic regions and type information associated with the dynamic regions for the specific type of details page.

FIG. 6 illustrates a data structure for an extracted data store 124 with attribute value pairs in accordance with some embodiments. The data extractor (122, FIG. 1) extracts data from the classified website pages based on the page models stored in the classified site models database (114, FIG. 1). The data extractor's crawlers extract content from dynamic regions identified in a corresponding page model. For example, in some implementations, a details page model's details page template identifies dynamic regions and type information associated with the dynamic regions for the classified website's details page is used by the data extractor's corresponding details page crawler to extract content from the dynamic regions identified by the details page template. The content extracted is stored in the extracted data store 124 according to attribute value pairs. In some embodiments, the content extracted using a details page crawler and the content extracted using a listing page crawler (and other crawlers) are stored together in the extracted data store 124. In other embodiments, each crawler's data is stored separately. FIG. 6 provides an exemplary list of attribute value pairs stored for data extracted from a details page for property rentals. These exemplary attribute value pairs include address (URL) 602, posting time 604, price 606, number of bedrooms 608, number of bathrooms 610, street address 612, smoking designation 614, pet designation 616, square feet 618, property type 620, neighborhood 622, apartment floor number 624 (if any), and text from a narrative description 626.

Other classified site categories of information will include different attribute value pairs depending on the dynamic content of their pages, as identified by the associated page models. For example, classified postings for the sale of used goods would have different attribute value pairs than those shown in FIG. 6, and classified postings for job openings would likewise have different attribute value pairs than used goods.

Figure 7:
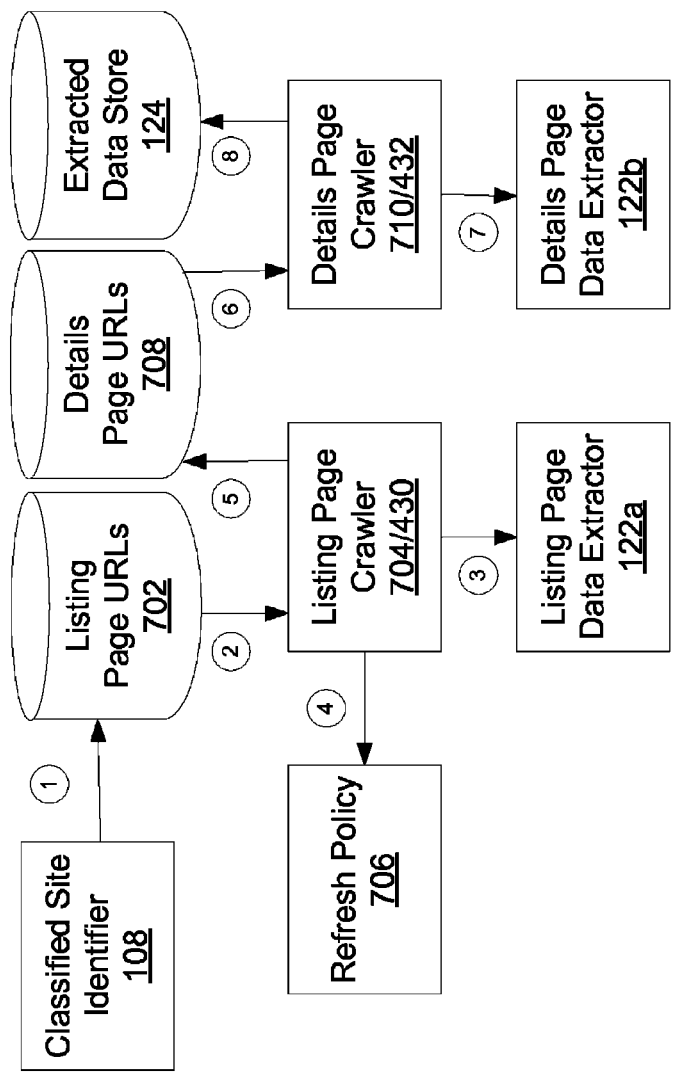
FIG. 7 is block diagram illustrating data extraction in accordance with some embodiments.

FIG. 7 is block diagram illustrating data extraction in accordance with some embodiments. At action 1 (actions are shown in numbered circles in FIG. 7), URLs of listing pages are added to a list of listing page URLs to be crawled 702. In some embodiments, the URLs of a candidate site's listing pages (as well as other candidate site pages) are included in a list of pages to be crawled after a candidate site has been determined to be a classified site by the Classified Site Identifier 108 according to the method(s) discussed with respect to FIG. 9. In some embodiments, the list includes annotated attributes. For example, for a listing page record having the address http://beijing.classified_forum_site_housing_rental.com/username1.htm the City=Beijing and the Category=housing_rental. At action 2, the listing page crawler 430 scans the list and determines which URLs should be crawled. In some embodiments, a crawling priority for a respective URL is determined based on refresh rate information and in accordance with a timestamp associated with the respective URL in the list. Then the corresponding pages are fetched in accordance with their crawling priority. At action 3 the listing page extractor 122*a* will determine the URLs of details page(s) associated with the respective listing page. In some embodiments, each row of a plurality of rows of a listing page table includes a link to a details page listing, and the URLs are thus extracted from the table. At action 4, a refresh policy 706 for the respective listing page is checked to determine when its next crawl time should be, and in some embodiments, this information is added to the corresponding record for the listing page in the list of listing page URLs. At action 5, URLs of the details page(s) are added to a list of details pages to be crawled 708. In some embodiments, the listing of URLs is kept in the same data store, while in other embodiments, as shown here in FIG. 7, the storage structures are separate. In some embodiments, before adding the URL of a respective details page, the details page is determined to be new (i.e., it is not a duplicate of a URL already in the list). In some embodiments, attributes associated with the details page listing which were extracted from the listing page are also included in the list of details page URLs 708. For example, in some embodiments, attributes are extracted from the title and/or details page link in the listing page table. At action 6, the details page crawler 432 scans the list and determines which URLs should be crawled. In some embodiments, a crawling priority for a respective URL is determined based on refresh rate information and in accordance with a timestamp associated with the respective URL in the details page list. Then the corresponding details pages are fetched as necessary. At action 7, the details page data extractor extracts attributes (attribute value pairs) from the details page. In some embodiments, the data extraction is performed in accordance with the method(s) described with respect to FIG. 8. Then at action 8, the extracted data is provided to the Extracted Data store 124.

Figure 8:
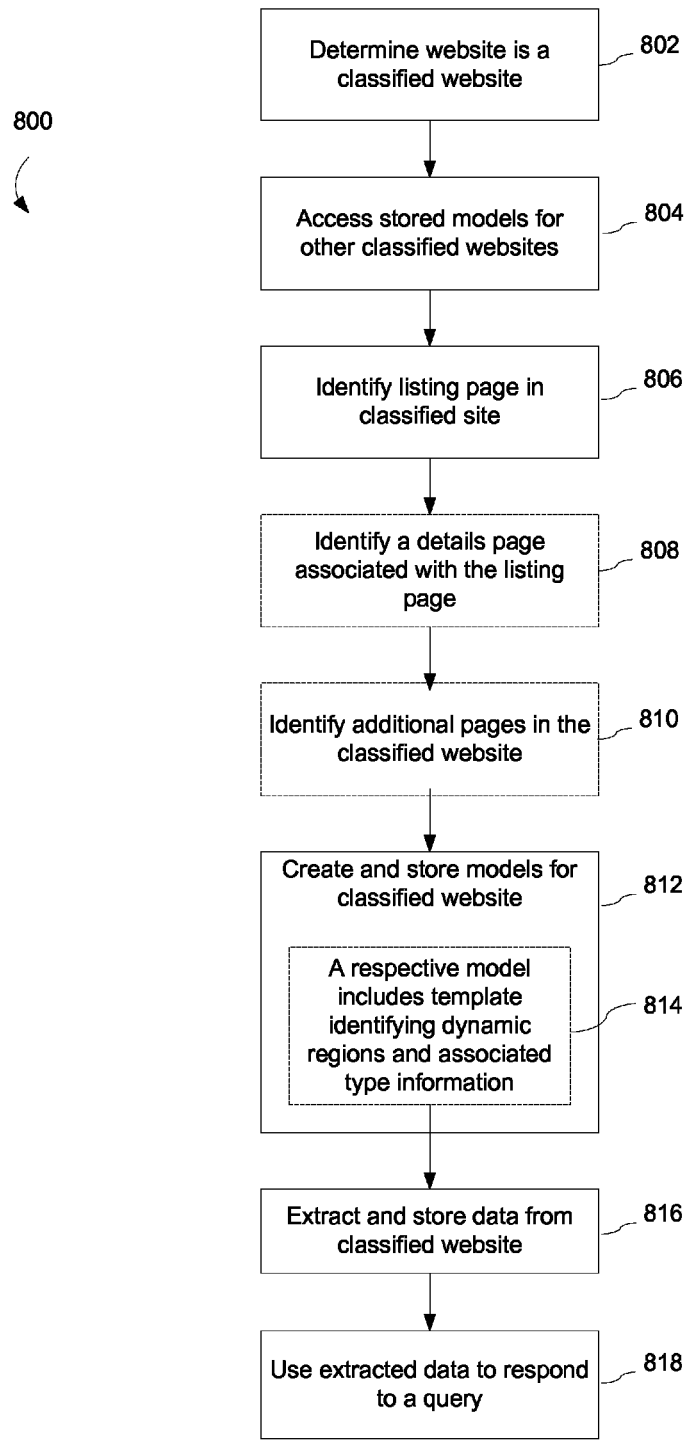
FIG. 8 is a flowchart representing a method of extracting data from a classified website in accordance with some embodiments.

FIG. 8 is a flowchart representing a method of extracting data from a classified website in accordance with some embodiments. The method is performed on a server system having one or more processors and memory storing one or more programs for execution by the one or more processors. This method 800 may be governed by instructions that are stored in a computer readable storage medium and that are executed by one or more processors of one or more servers. Each of the operations shown in FIG. 8 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically many of the operations shown in FIG. 8 correspond to instructions in memory of the server system 140 shown in FIG. 4. In some embodiments, the method is implemented by one or more of the following modules or programs: the classified site identification module 108, the page type identification module 118, the classified site analyzer 420, the model generator 116, the data extractor 122, and the communications module 412.

A website is determined to be a classified website (802). In some embodiments, the website is determined to be a classified website based on a set of heuristics including at least determining that the website contains common classified site terms. Methods of determining that a website is a classified website are explained in more detail with respect to FIG. 9 below.

Page models for other classified websites are accessed (804). In some embodiments, the page models include a corpus of models previously identified and automatically built by the model generator 116 of the classified site analysis server system 140. In other embodiments, the page models are a corpus of models manually built by operators to act as seed models for automatically building new models as explained herein. In some embodiments, the page models are a collection of both of these manually created and automatically generated page models. In some implementations, the page models for other classified websites include listing page models, detail page models, city page models, and/or category page models.

A listing page in the classified website is identified based on its similarity to the page models (806). In some embodiments, the listing page is identified based at least in part on having a set of rows exhibiting a repeating pattern. In some embodiments, the set of rows similar html tag sequences. Listing pages often have a recognizable table-like structure, where each row looks relatively similar to the row above it. In some embodiments, each row is for linking to a separate detail page with more information about the posting. It should be noted that in some implementations each row contains a single line of text, while in other embodiments, a row can contain multiple lines of text, links, and even images.

In some embodiments, a details page associated with the listing page in the classified website is also identified (808). In some implementations, the details page is identified because the identified listing page contains a link to the details page. In some implementations, all or most of the details pages for which the listing page has links, are identified in this manner.

In some embodiments, one or more additional pages in the classified website are also identified (810). In some implementations, the additional pages are identified based in part on user access data. In some embodiments, the access data includes Internet activity data for a group of users. For example, a client 110 may include a web search toolbar module 104, and with a user's permission, the toolbar module 104 may track Internet activity data such as search, browse, and click-through data. In some embodiments, this Internet activity data is provided to the classified site analysis server system 140. In some embodiments, this Internet activity is used to identify other pages within a website. For example, in some embodiments, if a listing page is identified, pages accessed prior to the listing page are determined. These pages are likely to be city pages or a category pages.

One or more models for one or more pages in the classified website are created by the model generator 116 and stored in the classified site models database 114 (812). For example, in some embodiments, a listing page model for the listing page in the classified website is created and stored. In some embodiments, one listing page model is created using numerous similar listing pages from the classified site. As such, a relatively general listing page model can be used in the next step for extracting information from new or updated listing pages. Similarly, in some embodiments, a details page model for the details page is created and stored. Likewise, in some embodiments, a details page model is created using numerous details pages. Also, in some embodiments, at least one additional model based on a respective page of the one or more additional pages is created and stored. For example, a city page or category page may be created and stored in this manner.

In some embodiments, creating and storing a listing page model includes creating a page template as follows (814). One or more dynamic regions within the page are identified. In some embodiments, the dynamic regions are identified based on DOM (document object model) analysis. A type of information associated with a respective dynamic region is identified. Some types of information may include price, number of bedrooms, property type, etc as shown in FIG. 6. A template that identifies the dynamic regions and their associated type of information is then created and stored in the classified site models database 114. For example, in some embodiments, creating and storing a listing page model may include: identifying one or more dynamic regions within a listing page, determining a type of information associated with a respective dynamic region, creating a listing page template that identifies the one or more dynamic regions and their associated type of information, and storing the listing page template (814). Similarly, in some embodiments, creating and storing a details page model also may include: identifying one or more dynamic regions within a details page, determining a type of information associated with a respective dynamic region, creating a details page template that identifies the one or more dynamic regions and their associated type of information, and storing the details page template (814).

In some embodiments, data from the classified website is extracted by the data extractor 122 and stored in the extracted data store 124 (816). In some embodiments, data from the classified website is extracted and stored based at least in part on the listing page model. In some embodiments, data from the classified website is also extracted and stored based at least in part on the details page model. Furthermore, in some embodiments, data from the classified website is extracted and stored based at least in part on another model such as a city page or category page model.

In some embodiments, extracting and storing data from the classified website (step 816) includes utilizing a template as follows. An appropriate page template is accessed. Content is extracted from dynamic regions identified in the template. Each portion of extracted content is stored in the extracted data store (124, FIG. 6) as a value for the type of information associated with its respective region identified in the template. For example, in some embodiments, extracted and storing data from a classified site's listing page may include: accessing a listing page template, extracting content from a dynamic region identified in the listing page template, and storing in a database the extracted content as a value for the type of information associated with the dynamic region identified in the listing page template. Similarly, in some embodiments, extracting and storing data from a classified website's details page may include: accessing a details page template, extracting content from a dynamic region identified in the details page template, and storing in a database the extracted content as a value for the type of information associated with the dynamic region identified in the details page template.

Figure 9:
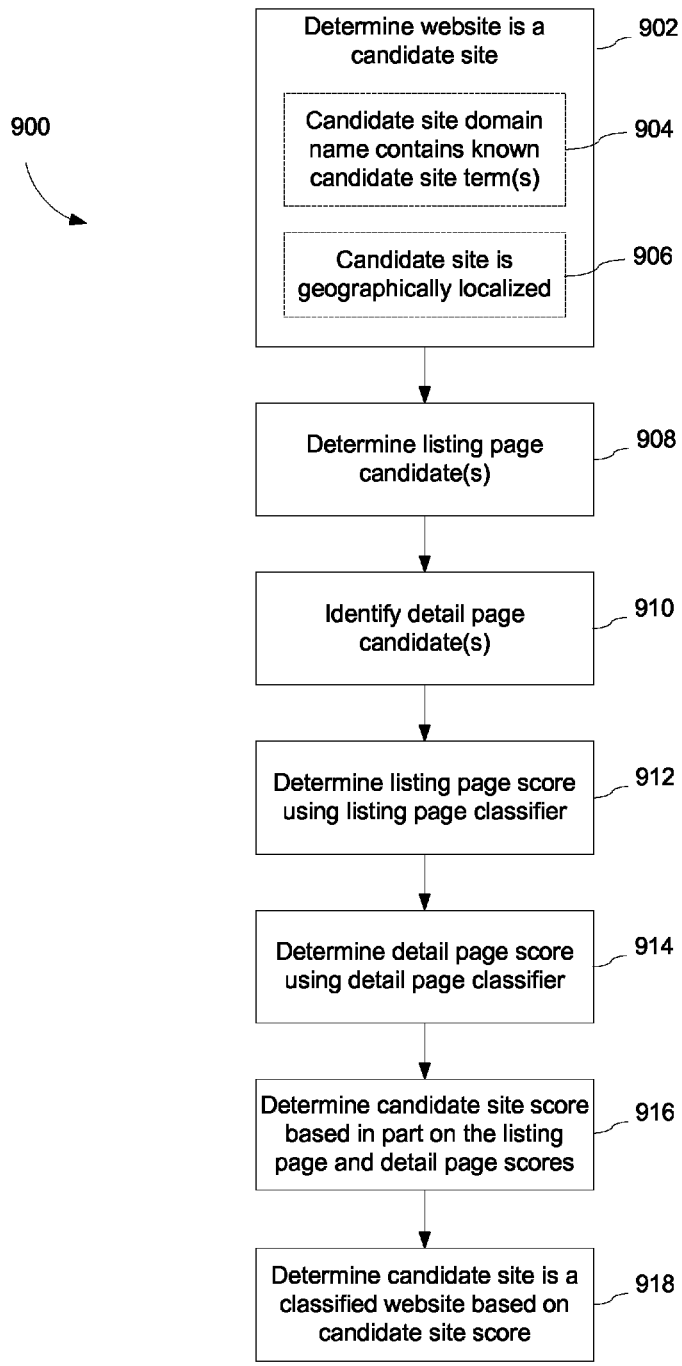
FIG. 9 is a flowchart representing a method of identifying classified websites in accordance with some embodiments.

FIG. 9 is a flowchart representing a method of identifying classified websites in accordance with some embodiments. The method is performed on a server system having one or more processors and memory storing one or more programs for execution by the one or more processors. This method 900 may be governed by instructions that are stored in a computer readable storage medium and that are executed by one or more processors of one or more servers. Each of the operations shown in FIG. 9 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically, many of the operations shown in FIG. 9 correspond to instructions in memory of the classified site analysis server system 140 shown in FIG. 4. In some embodiments, the method is implemented by one or more of the following modules or programs: the classified site identification module 108, the page type identification module 118, and the classified site analyzer 420.

A website is determined to be a candidate site (902). In some implementations, determining that a website is a candidate site includes determining that the website has a domain name containing a known candidate site term (904). For example, in some implementations a parallel program is run to group the pages {p} into groups based on a known domain name, e.g. all the pages under "kijiji.com" will be grouped together as pages of a candidate site. In some implementations, determining that a website is a candidate site includes determining that a candidate site is geographically localized (906). For example, in some implementations, the server system determines that a geographic location name is used prominently in a URL for the candidate site. For example, an algorithm may include looking at the pages in a website, seeing the URL patterns, and applying a heuristic URL pattern such as: "{cityname}.domain.com" to each page. If the heuristic applies, the site may be geographically localized. In some embodiments, the site is split into {p1}, {p2}, {p3} and each {p} is checked to see that it follows this format e.g. "sf.kijiji.com/ . . . " or "ny.kijiji.com/ . . . ."

From among the pages constituting the candidate site one or more listing page candidates are determined (908). Listing pages often have a recognizable table-like structure, where each row looks relatively similar to the row above it. Thus, in some implementations, a listing page candidate is determined based on its similarity to other listing page models stored in the classified site models database. In some implementations, the listing page candidate is determined based at least in part on having a set of rows exhibiting a repeating pattern with a similar html tag sequence.

Furthermore, from among the pages constituting the candidate site one or more detail page candidates are also determined (910). In some embodiments, each row in a listing page includes a link to a separate detail page with more information about the posting. As such, in some implementations, the details page candidate is determined because the candidate listing page contains a link to the candidate details page.

Then a listing page score is determined using a listing page classifier (912). The listing page score indicates a likelihood that the one or more listing page candidates are part of a classified website. In some embodiments, determining the listing page score includes determining a degree of similarity between keywords and URL tokens of the one or more listing page candidates and keywords and URL tokens of a corpus of known classified website pages. In some implementations, the corpus of known classified website pages include listing page models for at least 20 other classified websites, and a classifier model is trained on these classified website models. Some examples of classifiers which may be used include: WinNOW and Naive Bayes as well as other classifiers such as the neural network (multi-layer perceptrons), perceptrons support vector machines, k-nearest neighbors, Kernel estimation, Gaussian mixture model, Gaussian, naive Bayes, decision tree and RBF classifiers.

Similarly, in some embodiments, determining the listing page score (912) includes extracting URL tokens and keywords from the one or more listing page candidates and processing the extracted URL tokens and keywords using a classifier. In some implementations, the classifier is trained on a corpus of known classified sites. In some implementations, the trained models include differently weighted keywords and URL tokens. For example, in some embodiments, dealing with real estate listings "bedroom," "price," "nearby school" are keyword terms that will have a high weight, similarly URL token such as: "real-estate," "property," and "for-sale" will also have a high weight as compared to weights for terms and URL tokens not dealing with the sale or rental of real-estate. Terms and tokens with a high weight are associated with classified site predictability. As such, in some implementations, the extracted URL tokens and keywords include at least a first keyword and a second keyword, and when determining the listing page score, the classifier takes into account relative weights of the first keyword and second keyword. In some implementations, the weights are associated with classified site predictability.

Furthermore, a detail page score is determined using a detail page classifier (914). The detail page score indicates a likelihood that the one or more detail page candidates are part of a classified website. Similar to determining the listing page score, determining the detail page score includes determining a degree of similarity between keywords and URL tokens of the one or more detail page candidates and keywords and URL tokens of a corpus of known classified website pages in some embodiments. In some implementations, the details page score is determined by the same or similar classifiers to those discussed with respect to determining the listing page score. Furthermore, in some implementations, the corpus of known classified website pages includes details page models for at least 20 other classified websites, and a classifier model is trained on these classified website models.

In some embodiments, determining the detail page score (914) includes extracting URL tokens and keywords from the one or more detail page candidates and then processing the extracted URL tokens and keywords using a classifier. The classifier is trained on a corpus of known classified sites as explained above. In some embodiments, the URL tokens and keywords will have different weights which are associated with classified site predictability, as explained with respect to the listing page scoring. Thus, in some embodiments, the extracted URL tokens and keywords include at least a first keyword and a second keyword, and when determining the detail page score, the classifier takes into account relative weights of the first keyword and second keyword.

A candidate site score is determined based in part on a combination of the listing page score and the detail page score (916). In some embodiments, the site is given an over all weight or candidate site score as follows:

$$W(\text{Site}) = C(\{l\}) + C(\{d\})$$

C is the classifier discussed above (e.g., WinNOW, Naive Bayes, and others listed previously);
{l} is the set of listing page candidate(s); and
{d} is the set of details page candidate(s).

The candidate site is determined to be a classified website when the candidate site score is above a threshold (918). According to the formula above, when W(Site) is above a pre-determined threshold the candidate site is a classified site. In some embodiments, the threshold is determined based on manual analysis. In some embodiments, the threshold score is set lower than the average score for classified sites in the corpus of known classified websites. In some embodiments, the threshold is set at 70% of the average score for the corpus of known classified websites such that few new classified websites are excluded. While lower thresholds will create an over inclusive set of "classified" websites, in some embodiments, it is preferable to have an over inclusive rather than under inclusive set because data from the over inclusive set is likely to provide more complete results in response to a user query than an under inclusive set.

Each of the methods described herein may be governed by instructions that are stored in a computer readable storage medium and that are executed by one or more processors of one or more servers or clients. The above identified modules or programs (i.e., sets of instructions) need not be implemented as separate software programs, procedures or modules, and thus various subsets of these modules may be combined or otherwise re-arranged in various embodiments. Each of the operations shown in FIGS. 8 and 9 may correspond to instructions stored in a computer memory or computer readable storage medium.

FIG. 10 is a schematic screen shot of an exemplary listing page 1000 for a classified website. In some embodiments, a listing page 1000 has a listing page URL 1002 following the structure discussed with respect to FIG. 3, which includes a geographic region portion 1004 and a site name portion 1006 as well as a listing page category portion 1006. The fact that a geographic region portion 1004 is used prominently in a listing page URL 1002, such as being listed even before the site name portion 1006 is used in some embodiments to determine that a site is a candidate site (i.e. a potential classified site which will then be further analyzed according to the method(s) described with respect to FIG. 9.) In some embodiments, the listing page URL 1002 includes other terms 1008 (or abbreviations) that specifically describe the category and/or region that the listing page covers. For example, terms such as "East Bay," "housing," "apartment," "rentals," "csf (for city of San Francisco), and "hhh" for (all housing), may be other terms 1008 which are included in some listing page URLs. Terms (or abbreviations thereof) which are commonly used in URLs of classified websites are used in some embodiments to determine that a site is a candidate site. The URL tokens are also used in some embodiments in determining a listing page score for a listing page candidate. For example, in some embodiments, a degree of similarity between URL tokens of a listing page candidate and URL tokens of a corpus of known classified website pages is determined, and is then used in determining its listing page score.

In some embodiments, the listing page 1000 will also include search refinement options 1010. For example, within a category 1012 of the listing page 1000 a search box 1014, pull down menu options 1016, radio buttons 1018 for yes/no or select or not inclusions, and price range fields 1020 may be available. The topics (terms) associated with the search refinement options 1010 are used in some embodiments to determine that a site is potentially a classified site. A term or associated category which is searchable, is likely an important classified site option. For example, determining that number of bedrooms is a search refinement option 1010, is a stronger indicator that a site is a classified site than just finding the terms "number of bedrooms" elsewhere on a page of a website. As such, terms which are commonly used in search refinement options by other known classified websites are used in some embodiments to determine that a site is a candidate site.

Classified website listing pages, such as the listing page 1000 shown in FIG. 10, tend to include a table (or a table like structure) 1022. The table like structure 1022 of the listing page 1000 shown herein includes a number of rows 1024 in which each row looks relatively similar to the row above it. Each row (one or more lines of text) includes a link 1026 to a separate detail page with more information about the posting. In some embodiments, each row 1024 includes a title 1028, which is the details page link 1026 in some embodiments, as shown in the first listing of FIG. 10, but is separate from or includes more words other than the words included in the details page link 1026 in other embodiments, as shown in the last listing of FIG. 10. The row 1024 may also contain descriptive information 1030 (e.g. "with internet," "fully furnished," "quiet," "balcony" etc). Most embodiments will also include price information 1032 about the posting, and postings often include geographic information 1034. It should be noted that geographic information is often included in classified postings, even when the advertised item is not real-estate. For example, classified items for sale are often available to be picked up at the seller's address.

Listing pages usually display postings for a particular category or categories of listing within the city (or area) with which they are associated. FIG. 10's listing page 1000 is specifically for the category 1012 of "housing" in the "city of San Francisco" in the "SF Bay area classified forum site." Other listing pages will display "housing" for other areas such as "South Bay" and "East Bay," while other listing pages will display items for sale, items for rent, jobs, personals, etc for "the city of San Francisco" or the other areas within the SF Bay area classified forum site.

In some embodiments, the terms (or abbreviations) appearing in the listing page table 1022 are used in determining that a site is a candidate site. In some embodiments, terms/keywords, appearing anywhere on the page, including the listing page table 1022, are used for this purpose. For example, when terms like "bedroom," "apartment," and "for rent" appear on a website page, these terms are relatively strong indicators that the page is part of a classified website. In some embodiments, these keywords are also used in determining a listing page score for a listing page candidate. For example, in some embodiments a degree of similarity between keywords of a listing page candidate and keywords of a corpus of known classified website pages is determined, and is then used in determining its listing page score.

The data in listing page table 1022 and elsewhere on the listing page 1000 is extracted by the data extractor (122, FIG. 1) and stored in the extracted data store (124, FIG. 1) in accordance with the method described in FIG. 8. For example, in some embodiments, dynamic regions within the listing page are determined, and the type of information associated with a respective dynamic region is also determined. Then a listing page template that identifies the one or more dynamic regions and their associated type of information is created and stored in the classified site models database (114, FIG. 1). When the listing page is crawled, the listing page template is accessed and content is extracted from the listing page according to the dynamic regions identified in the template. This content is then stored according to its type in the extracted data store (124, FIG. 1), and this data is then available and used to respond to classified site related queries.

Figure 11:
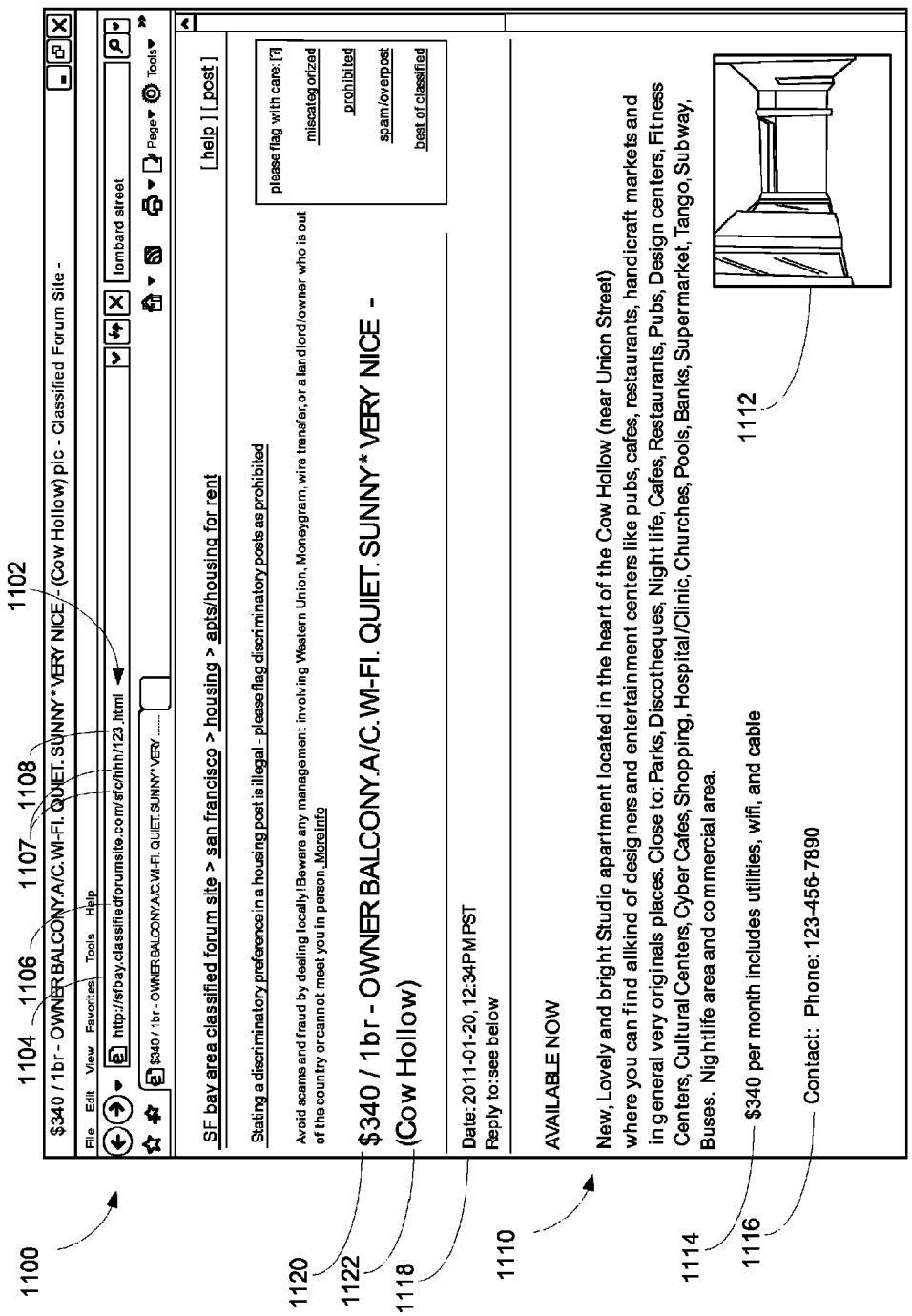
FIG. 11 is a schematic screen shot of an exemplary details page for a classified website.

FIG. 11 is a schematic screen shot of an exemplary details page 1100 for a classified website. In some embodiments, each line of a listing page's list corresponds to a details page. The details page provides more information about the item than was available in the line of the listing page. As shown in FIG. 11, in some embodiments, a details page provides a narrative description 1110 written by an individual poster about the posted item which provides more information about the posting. In some embodiments, details pages provide pictures of the posted item 1112, price information 1114, contact information for the owner/seller 1116, and a variety of other information such as posting time 1118, a title (which often matches the title appearing in the of the listing page table). In most embodiments, an address or geographic information (such as neighborhood) 1122 is provided as well.

In some embodiments, the terms (or abbreviations) appearing in the narrative description 1110 are used in determining that a site is a candidate site. In some embodiments, terms/keywords, appearing anywhere on the page, including the narrative description 1110, are used for this purpose. In some embodiments, these keywords are also used in determining a details page score for a details page candidate. For example, in some embodiments, a degree of similarity between keywords of a details page candidate and keywords of a corpus of known classified website pages is determined, and is then used in determining its details page score. The data in the narrative description 1110 and elsewhere on the details page 1100 is extracted by the data extractor (122, FIG. 1) and stored in the extracted data store (124, FIG. 1) in accordance with the method described in FIG. 8. For example, in some embodiments, dynamic regions within the details page are determined, and the type of information associated with a respective dynamic region is also determined. Then a details page template that identifies the one or more dynamic regions and their associated type of information is created and stored in the classified site models database (114, FIG. 1). When the details page is crawled, the details page template is accessed and content is extracted from the details page according to the dynamic regions identified therein. This content is then stored according to its type in the extracted data store (124, FIG. 1). This data is then available and used to respond to classified site related queries.

In some embodiments, a details page 1100 has a details page URL 1102 following the structure discussed with respect to FIG. 3, which includes a geographic region portion 1104, and a site name portion 1106, optional category portions 1107, and a details page ID 1108. In some embodiments, details page URL 1102 includes a date and time stamp of the posting of the details page. The date and time are included as a part of the details page ID 1108. As explained above with respect to the listing page URL, the fact that a geographic region portion 1104 is used prominently in a details page URL 1102, is also used in some embodiments to determine whether the site that the details page is associated with is a classified candidate site. In some embodiments, the details page URL 1102 includes other terms 1110 (or abbreviations) that specifically describe aspects of the detail page posting. These terms or URL tokens are also used in some embodiments in determining a details page score for a details page candidate. For example, in some embodiments, a degree of similarity between URL tokens of a details page candidate and URL tokens of a corpus of known classified website pages is determined, and is then used in determining its details page score.

In the detailed description above, numerous specific details are set forth in order to provide a thorough understanding of the described embodiments. However, it will be apparent to one of ordinary skill in the art that other embodiments may be practiced without these specific details. In other instances, well-known methods, procedures, components, and networks were not described in detail so as not to unnecessarily obscure aspects of the embodiments.

It will also be understood to one of ordinary skill in the art that, although the terms first, second, etc. may have been used herein to describe various elements, these elements should not be limited by these terms. These terms are only used to distinguish one element from another. For example, a first element could be termed a second element, and, similarly, a second element could be termed a first element, without changing the meaning of the description. The first element and the second element are both elements, but they are not the same element.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, steps, operations, elements, and/or components, but do not preclude the presence or addition of one or more others. As used herein, the term "if" may be construed to mean "when" or "upon" or "in response to," depending on the context.

The detailed description above is described with reference to specific embodiments, for purpose of explanation. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method of automatically extracting data from a classified website comprising:
on a server system having one or more processors and memory storing one or more programs for execution by the one or more processors:
determining that a website is an area specific classified website based at least in part upon determining that the website is geographically localized;
accessing page models for other classified websites;
identifying a listing page in the classified website based on similarity of the listing page to the page models;
creating a listing page model for the listing page comprising;
identifying one or more dynamic regions within the listing page;
determining a type of information associated with a respective dynamic region of the one or more identified dynamic regions;
creating a listing page template that identifies the one or more dynamic regions and their associated type of information; and
storing the listing page template;
extracting data from the classified website based at least in part on the listing page model; and
saving the extracted data in a database responsive to a classified site query by a user.

2. The method of claim 1, further comprising:
identifying a details page associated with the listing page in the classified website;
creating a details page model for the details page; and
extracting data from the classified website based at least in part on the details page model.

3. The method of claim 2, wherein creating the details page model comprises:
identifying one or more dynamic regions within the details page;
determining a type of information associated with a respective dynamic region of the one or more identified dynamic regions;
creating a details page template that identifies the one or more dynamic regions and their associated type of information; and
storing the details page template.

4. The method of claim 3, wherein extracting data from the classified website comprises:
accessing the details page template;
extracting content from a dynamic region identified in the details page template; and
storing in the database the extracted content as respective values for the types of information associated with the one or more dynamic regions identified in the details page template, wherein the database includes a plurality of attribute-value pairs, the values being derived from the extracted content, and the attributes being derived from the type of information associated with respective ones of the values.

5. The method of claim 1, further comprising:
identifying one or more additional pages in the classified website based in part on user access data;
creating at least one additional model based on a respective page of the one or more additional pages; and
extracting data from the classified website based at least in part on the additional model.

6. The method of claim 5, wherein the access data comprises Internet activity data for a group of users.

7. The method of claim 1, wherein the page models for other classified websites include one or more of: listing page models, detail page models, and city page models.

8. The method of claim 1, wherein extracting data from the classified website comprises:
accessing the listing page template;
extracting content from a dynamic region identified in the listing page template; and
storing in the database the extracted content as respective values for the types of information associated with the one or more dynamic regions identified in the listing page template, wherein the database includes a plurality of attribute-value pairs, the values being derived from the extracted content, and the attributes being derived from the type of information associated with respective ones of the values.

9. The method of claim 1, wherein the website is determined to be a classified website based on a set of heuristics including at least determining that the website contains common classified site terms.

10. The method of claim 1, wherein the listing page is identified based at least in part on having a set of rows exhibiting a repeating pattern.

11. A server system, for automatically extracting data from a classified website, comprising:
one or more processors; and
memory storing one or more programs to be executed by the one or more processors;
the one or more programs comprising instructions for:
determining that a website is an area specific classified website based at least in part upon determining that the website is geographically localized;
accessing page models for other classified websites;
identifying a listing page in the classified website based on similarity of the listing page to the page models;
creating a listing page model for the listing page comprising;
identifying one or more dynamic regions within the listing page;
determining a type of information associated with a respective dynamic region of the one or more identified dynamic regions;
creating a listing page template that identifies the one or more dynamic regions and their associated type of information; and
storing the listing page template;
extracting data from the classified website based at least in part on the listing page model; and
saving the extracted data in a database responsive to a classified site query by a user.

12. The system of claim 11, further comprising instructions for:
identifying a details page associated with the listing page in the classified website;
creating a details page model for the details page; and
extracting data from the classified website based at least in part on the details page model.

13. The system of claim 12, wherein instructions for creating the details page model comprises instructions for:
identifying one or more dynamic regions within the details page;
determining a type of information associated with a respective dynamic region of the one or more identified dynamic regions;
creating a details page template that identifies the one or more dynamic regions and their associated type of information; and
storing the details page template.

14. The system of claim 13, wherein instructions for extracting data from the classified website comprises instructions for:
accessing the details page template;
extracting content from a dynamic region identified in the details page template; and
storing in the database the extracted content as respective values for the types of information associated with the one or more dynamic regions identified in the details page template, wherein the database includes a plurality of attribute-value pairs, the values being derived from the extracted content, and the attributes being derived from the type of information associated with respective ones of the values.

15. The system of claim 11, further comprising instructions for:
identifying one or more additional pages in the classified website based in part on user access data;
creating at least one additional model based on a respective page of the one or more additional pages; and
extracting data from the classified website based at least in part on the additional model.

16. The system of claim 15, wherein the access data comprises Internet activity data for a group of users.

17. The system of claim 11, wherein instructions for extracting data from the classified website comprises instructions for:
accessing the listing page template;
extracting content from a dynamic region identified in the listing page template; and
storing in the database the extracted content as respective values for the types of information associated with the one or more dynamic regions identified in the listing page template, wherein the database includes a plurality of attribute-value pairs, the values being derived from the extracted content, and the attributes being derived from the type of information associated with respective ones of the values.

18. A non-transitory computer readable storage medium storing one or more programs configured for execution by a computer, the one or more programs comprising instructions for:
determining that a website is an area specific classified website based at least in part upon determining that the website is geographically localized;
accessing page models for other classified websites;
identifying a listing page in the classified website based on similarity of the listing page to the page models;
creating a listing page model for the listing page comprising;
identifying one or more dynamic regions within the listing page;
determining a type of information associated with a respective dynamic region of the one or more identified dynamic regions;
creating a listing page template that identifies the one or more dynamic regions and their associated type of information; and
storing the listing page template;
extracting data from the classified website based at least in part on the listing page model; and
saving the extracted data in a database responsive to a classified site query by a user.

19. The non-transitory computer readable storage medium of claim 18, further comprising instructions for:
identifying a details page associated with the listing page in the classified website;
creating a details page model for the details page; and
extracting data from the classified website based at least in part on the details page model.

20. The non-transitory computer readable storage medium of claim 19, wherein instructions for creating the details page model comprises instructions for:
identifying one or more dynamic regions within the details page;
determining a type of information associated with a respective dynamic region of the one or more identified dynamic regions;
creating a details page template that identifies the one or more dynamic regions and their associated type of information; and
storing the details page template.

21. The non-transitory computer readable storage medium of claim 20, wherein instructions for extracting data from the classified website comprises instructions for:
accessing the details page template;
extracting content from a dynamic region identified in the details page template; and storing in the database the extracted content as respective values for the types of information associated with the one or more dynamic regions identified in the details page template, wherein the database includes a plurality of attribute-value pairs, the values being derived from the extracted content, and the attributes being derived from the type of information associated with respective ones of the values.

22. The non-transitory computer readable storage medium of claim 18, further comprising instructions for:

identifying one or more additional pages in the classified website based in part on user access data;

creating at least one additional model based on a respective page of the one or more additional pages; and extracting data from the classified website based at least in part on the additional model.

23. The non-transitory computer readable storage medium of claim 22, wherein the access data comprises Internet activity data for a group of users.

24. The non-transitory computer readable storage medium of claim 18, wherein instructions for extracting data from the classified website comprises instructions for:

accessing the listing page template;

extracting content from a dynamic region identified in the listing page template; and storing in the database the extracted content as respective values for the types of information associated with the one or more dynamic regions identified in the listing page template, wherein the database includes a plurality of attribute-value pairs, the values being derived from the extracted content, and the attributes being derived from the type of information associated with respective ones of the values.

* * * * *